US010378905B2

(12) United States Patent
Zhu et al.

(10) Patent No.: US 10,378,905 B2
(45) Date of Patent: Aug. 13, 2019

(54) AUXILIARY BERTHING METHOD AND SYSTEM FOR VESSEL

(71) Applicant: NANJING UNIVERSITY 5D TECHNOLOGY CO., LTD., Nanjing, Jiangsu (CN)

(72) Inventors: Xi Zhu, Jiangsu (CN); Yuanyuan Li, Jiangsu (CN); Feng Yan, Jiangsu (CN); Xiang Li, Jiangsu (CN); Xun Cao, Jiangsu (CN); Weisong Pan, Jiangsu (CN); Jianwen Ding, Jiangsu (CN); Jibin Wang, Jiangsu (CN); Jun Wang, Jiangsu (CN); Chen Chen, Jiangsu (CN); Dapeng Li, Jiangsu (CN); Wei Li, Jiangsu (CN); Wenzhu Wang, Jiangsu (CN)

(73) Assignee: NANJING UNIVERSITY 5D TECHNOLOGY CO., LTD., Nanjing, Jinagsu (CN)

( * ) Notice: Subject to any disclaimer, the term of this patent is extended or adjusted under 35 U.S.C. 154(b) by 35 days.

(21) Appl. No.: 15/543,934

(22) PCT Filed: Sep. 28, 2015

(86) PCT No.: PCT/CN2015/090931
§ 371 (c)(1),
(2) Date: Jul. 14, 2017

(87) PCT Pub. No.: WO2016/112714
PCT Pub. Date: Jul. 21, 2016

(65) Prior Publication Data
US 2018/0010917 A1    Jan. 11, 2018

(30) Foreign Application Priority Data

Jan. 15, 2015 (CN) .......................... 2015 1 0021342

(51) Int. Cl.
*G01C 21/20* (2006.01)
*G08G 3/00* (2006.01)
(Continued)

(52) U.S. Cl.
CPC .......... *G01C 21/203* (2013.01); *G06T 3/0006* (2013.01); *G06T 7/50* (2017.01);
(Continued)

(58) Field of Classification Search
USPC ......................................................... 382/104
See application file for complete search history.

(56) References Cited

U.S. PATENT DOCUMENTS 7,542,376 B1 * 6/2009 Thompson .............. G01S 15/89
367/104
7,561,886 B1 * 7/2009 Gonring ................... G01C 1/00
340/514
(Continued)

FOREIGN PATENT DOCUMENTS

CN        101363918 A    2/2009
CN        102236327 A    11/2011
(Continued)

*Primary Examiner* — Jerome Grant, II
(74) *Attorney, Agent, or Firm* — Novick, Kim & Lee, PLLC; Allen Xue

(57) ABSTRACT

The present invention provides an auxiliary berthing method and system for a vessel. In the berthing method, by a solar blind ultraviolet imaging method, a position and an attitude of a vessel relative to a shoreline of a port berth during berthing are calculated by at least two solar blind ultraviolet imaging modules according to light signals received by a solar blind ultraviolet light source array arranged in advance on the shore. Further, when more than three solar blind ultraviolet imaging modules are used, in the method and device of the present invention, a normalized correlation algorithm and a data fusion algorithm are used to improve the accuracy of the position and attitude data of the vessel.

10 Claims, 6 Drawing Sheets

(51) Int. Cl.
  *G06T 7/50* (2017.01)
  *G06T 7/77* (2017.01)
  *G06T 3/00* (2006.01)

(52) U.S. Cl.
  CPC ............. *G06T 7/77* (2017.01); *G08G 3/00* (2013.01); *B63B 2213/00* (2013.01); *G06T 2207/10028* (2013.01); *G06T 2207/20024* (2013.01); *G06T 2207/30241* (2013.01); *G06T 2207/30252* (2013.01)

(56) References Cited

U.S. PATENT DOCUMENTS

| | | | |
|---|---|---|---|
| 7,729,203 B2 * | 6/2010 | Betts | G01S 7/521 |
| | | | 342/357.22 |
| 9,840,312 B1 * | 12/2017 | Clark | B63B 49/00 |
| 2003/0137445 A1 | 7/2003 | Van Rees et al. | |
| 2008/0239870 A1 * | 10/2008 | Dubuis | G01S 7/539 |
| | | | 367/21 |
| 2010/0157736 A1 * | 6/2010 | Riordan | G01S 15/87 |
| | | | 367/88 |
| 2016/0214534 A1 * | 7/2016 | Richards | H04N 5/332 |
| 2016/0223659 A1 * | 8/2016 | Mandelert | G01S 7/539 |
| 2018/0099317 A1 * | 4/2018 | Salters | B08B 17/02 |

FOREIGN PATENT DOCUMENTS

| | | |
|---|---|---|
| CN | 103175523 A | 6/2013 |
| CN | 103177606 A | 6/2013 |
| CN | 103745617 A | 4/2014 |
| CN | 203534599 U | 4/2014 |
| JP | 2003276677 A | 10/2003 |

* cited by examiner (a)                                 (b)

AUXILIARY BERTHING METHOD AND SYSTEM FOR VESSEL

TECHNICAL FIELD OF THE INVENTION

The present invention relates to a safe navigation method and system for a vessel. More particularly, the present invention relates to a method and device for accurately monitoring a distance from a vessel and a shoreline and an attitude of the vessel during the berthing of the vessel.

BACKGROUND OF THE INVENTION

Safe vessel berthing is always an emphatically studied object in the water transportation field. In the process of berthing a vessel at a port or a wharf, the berthing speed and distance needs to be controlled strictly, and the attitude of the vessel also needs to be considered. A pilot must know very well geographic features, waterways, depth of water, water flow, settings of navigation marks, and local rules and regulations within a water area, and must have proficient skills for handling high berthing difficulties. Therefore, the pilot has very high working intensity, and also faces various safety risks.

In the water transportation field, severe weather, particularly foggy weather, seriously affects the smoothness of waterways. Statistical maritime data indicated that most of maritime accidents occur at night or in restricted visibility, and the maritime accidents in restricted visibility were in the majority; and fog is one of the most important factors causing the restricted visibility. When a vessel navigates in fog, due to various uncertain factors (e.g., the dynamic state of the vessel, the subjective intention of a navigator or the like), the navigator often makes a wrong decision, resulting in a maritime accident. At present, devices for aiding navigation mainly include a radar navigation system and an automatic identification system.

As for vessel piloting, the foggy weather will seriously influence the visual observation effect of a pilot, and consequently, the pilot is unable to judge the attitude of a vessel relative to a berth and thus unable to conduct the safe berthing of the vessel. Even if hydrological conditions at different ports and waterways are different, vessels will generally slow down at a visibility less than 1 sea mile, and large vessels will generally stop at a visibility less than 1000 m. Due to low visibility in the foggy weather, serious accidents often occur, for example, large vessels crash into piers. Meanwhile, vessel's passing a dam is influenced by the foggy weather, and the vessel must stopping passing the dam in the foggy weather. Therefore, the foggy weather not only influences the safety of vessel navigation, and also seriously influences the smoothness of waterways and port logistics.

At present, during the navigation and berthing of a vessel, some radio piloting systems, for example, radar, will be used for reference. However, a radar system is easily affected by external factors, such as weather, topography and external disturbance. Moreover, since the radar is generally erected at a high position on a vessel, it is difficult to detect conditions at a close distance from the vessel although it can detect conditions at a large distance from the vessel. Therefore, the radar system has great limitations during the piloting and berthing of a vessel. At present, a vessel berthing scheme is generally determined based on the visual estimation and judgment of a pilot. To avoid the occurrence of potential accidents, it is stipulated that no vessel's navigation and transportation is allowed in the severe weather.

Considering the actual demands of huge freight volume and turnover volume of passenger traffic nowadays, some navigation aid devices used in the severe weather have been developed, for example, a radar navigation system, an Automatic Identification System (AIS) and the like in the navigation field. Although these navigation aid devices may assist a navigator in navigating in the severe weather conditions, they still have many disadvantages due to many aspects such as technology, cost, precision and site.

Both the radar navigation system and the AIS in the prior art are navigation aid systems based on radio communication. As the common means for vessel navigation assistance, a radar navigation system for vessels has inevitable defects although it works well in positioning, navigation and collision prevention. For example, in the severe weather conditions (e.g., rainy, snowy or stormy weather), the radar navigation system is easily interfered by sea waves, rain and snow to generate clutters; and radars at a same frequency or an approximate frequency will also generate co-frequency radar interference clutters at a close distance. Moreover, the radar generally has a fixed blind zone of 30 m to 50 m, so that a sectored shadow zone will be generated due to the influence from objects such as a mast on the vessel. Additionally, due to the influence from complicated conditions, the radar will generate various false echoes, for example, multi-trace false echo, second-trace false echo, indirect-reflection false echo, side-lobe echo and the like. In the actual use, all the interference clutters and the false echoes will often make a manipulator difficult to distinguish or observe, and thus result in wrong guidance for navigation.

The Automatic Identification System (AIS) for vessels is a device based on satellite positioning, with a precision of 5 m to 30 m. Due to the absence of any blind zone, its positioning precision is higher than that of the radar and does not change with the change in distance and orientation of a target. The AIS consists of shore-based (base station) facilities and ship-borne devices, and is a novel digital navigation aiding system and device integrating the network technology, the modern communications technology, the computer technology and the electronic information display technology. The AIS is essentially a broadcast transponder system, which operates on a maritime mobile communication channel VHF and can automatically transmit information about a vessel (e.g., the name of the vessel, call sign, maritime mobile service identity, location, course, speed and the like) to other vessels or the shore, process multiplex communication at a rapid update rate, and use a self-control time division multiple access technology to fulfill the high density of communication, so that the reliability and real-time performance of ship-to-ship and ship-to-shore operations are ensured. However, the AIS also have many limitations. Firstly, like the radar navigation system, the provided information is not a real visual image and thus does not really help the berthing and navigation in the foggy weather. Since a pilot fails to see the ambient environment, the vessel also needs to be stopped. Secondly, the equipment precision of 5 m to 30 m perhaps meets the requirements for collision prevention; however, for close-distance berthing, a precision error of 5 m easily results in a serious collision of a large vessel with a wharf or a lighter at the critical moment of berthing.

In conclusion, the two navigation aids in the prior art, i.e., the marine radar navigation system and the ship-borne AIS, still cannot make a vessel berthed safely during close-distance navigation in the low-visibility conditions.

Recently, solar blind ultraviolet navigation and berthing systems have been developed in the prior art. On the basis of the solar blind ultraviolet phenomenon within a waveband of 200 nm to 280 nm, a group of solar blind ultraviolet light source lamps are provided on the shore, and a solar blind ultraviolet detector is provided on a vessel to be navigated and berthed. The position of the vessel relative to a wharf is eventually obtained according to the solar blind ultraviolet light signals received by the detector, so that it is advantageous for safe berthing. For example, Chinese Patent Application No. 2012105507102, entitled NAVIGATION AND BERTHING SYSTEM BASED ON SOLAR ULTRAVIOLET LIGHT SIGNALS, has disclosed a solar blind ultraviolet auxiliary berthing system. The system consists of a solar blind ultraviolet light source system, a three-axis electronic compass, an optical imaging module and an information processing terminal. The three-axis electronic compass is connected to the optical imaging module to acquire angular information of the optical imaging module during rotation. The optical imaging module includes a spectroscope, a visible or infrared imaging channel and a solar blind ultraviolet imaging channel, wherein the visible or infrared imaging channel receives visible light signals and outputs visible or infrared video signals, and the solar blind ultraviolet imaging channel receives solar blind ultraviolet light signals and outputs solar blind ultraviolet video signals. The information processing terminal is used for calculating navigation attitude data of the vessel according to digital signals of the two videos and then outputting a composite video to a display system. In this patent application, by connecting the three-axis electronic compass to the optical imaging module, the angular information of the optical imaging module during rotation is acquired, and angular information of the vessel relative to the shoreline is eventually obtained. However, this system still has some disadvantages. For example, when in use, the three-axis electronic compass will be interfered by a large magnetic field sometimes, so that the obtained data has an error. As a result, it is very difficult to obtain the accurate distance from the vessel to the shoreline of a berth, and it is thus difficult to realize safe berthing.

Therefore, in the prior art, the accurate positioning, berthing and piloting of a vessel in the foggy weather cannot be ensured conveniently, accurately and safely at present.

SUMMARY OF THE INVENTION

To solve the above problems, an objective of the present invention is to provide a berthing method for a vessel, which uses a solar blind ultraviolet detection technology to obtain data on the attitude and relative distance of a vessel relative to a shoreline and a berth for purpose of safe berthing of the vessel. Another objective of the present invention is to provide a system for guiding a vessel to berth.

According to one aspect of the present invention, the present invention provides a method for berthing a vessel. In the method, a position and an attitude angle of the vessel relative to a shoreline are determined by a solar blind ultraviolet imaging method. The method comprises the steps of: providing at least two solar blind ultraviolet imaging modules on the vessel, receiving, by the solar blind ultraviolet imaging modules, light signals transmitted by a solar blind ultraviolet light source array arranged in advance on the shore, and processing the light signals by a signal processor to obtain a position relationship between the solar blind ultraviolet imaging modules and a related berth, so as to obtain data on a position relationship between the vessel and the shoreline of the related berth.

The position relationship between the vessel and the shoreline of the related berth may be represented in various ways. One way is that the position relationship is represented by the position data of a number of reference points on the vessel relative to the shoreline of the berth. Preferably, the position relationship is represented by the position data of a reference point on the vessel relative to the shoreline of the berth and the attitude angle of the vessel. The attitude angle of the vessel is an angle representing a relationship between the vessel and the ambient environment (e.g., the shore), for example, including at least one of a course angle, an angle of pitch and a angle of roll.

In the present invention, the solar blind ultraviolet imaging modules receive light signals from a solar blind ultraviolet light source array arranged in advance on the shore, then convert the received light signals into electrical signals, and transmit the electrical signals to a signal processor; and, the signal processor calculates, according to the electrical signals corresponding to the light signals received by the solar blind ultraviolet imaging modules, information about a position relationship between the vessel and a related berth, and determines an attitude angle of the vessel. In another way, the signal processor is integrated into the solar blind ultraviolet imaging modules. Actually, various components with an operation function in the system may be used to process the received solar blind ultraviolet light.

Specifically, the solar blind ultraviolet imaging modules receive solar blind ultraviolet light signals transmitted by the solar blind ultraviolet light source array arranged in advance on the shore, respectively; then, a translation vector of each solar blind ultraviolet imaging module relative to the solar blind ultraviolet light source array is obtained, respectively; and, a distance from the vessel to the solar blind ultraviolet light source array is obtained from the translation vector. Since the position relationship between the solar blind ultraviolet light source array arranged in advance and the related berth is already determined, information about the position relationship between the vessel and the related berth may be obtained. Furthermore, the signal processor calculates, according to the received solar blind ultraviolet light signals transmitted by the solar blind ultraviolet light source array, a vector representation of a connection line between the two solar blind ultraviolet imaging modules in a target lattice coordinate system, obtains, according to an arrangement mode of the solar blind ultraviolet imaging modules on the vessel, a vector representation of the vessel in the target lattice coordinate system, and calculates, according to a preset or pre-measured vector representation of a shoreline of a wharf in the target lattice coordinate system, an attitude angle of an axis of the vessel relative to the shoreline, so as to determine the position and attitude of the vessel relative to the shoreline of the berth.

In the present invention, the attitude angle of the vessel generally refers to at least one of a course angle, an angle of pitch and a angle of roll of the vessel. Of course, the attitude angle may also be an angle better representing the attitude of the vessel relative to the shoreline.

In accordance with the method of the present invention, the position relationship between the vessel and the target berth and shoreline may be uniquely determined by two solar blind ultraviolet imaging modules. If three or more solar blind ultraviolet imaging modules are used, generally, every two solar blind ultraviolet imaging modules may form an independent solar blind ultraviolet imaging system for determining the position relationship between the vessel and the target berth and shoreline.

When three or more solar blind ultraviolet imaging modules form an independent solar blind ultraviolet imaging system, the data may be integrated based on the redundancy of original data, to obtain a better numerical value representing the position relationship between the vessel and the shoreline.

Preferably, in the method of the present invention, the received data of the plurality of solar blind ultraviolet imaging modules may be processed by a normalized correlation algorithm. In the normalized correlation processing method, a threshold for an average confidence value of a detection system consisting of all the solar blind ultraviolet imaging modules and the confidence of each solar blind ultraviolet imaging module may be obtained by global error analysis, positioning data with a lower confidence is filtered by using the threshold to obtain a final confidence weight for each module, and weighted averaging is performed on each module by using the confidence weight so as to obtain the final data. The normalized correlation algorithm may be solidified into the system in a form of hardware (e.g., IC, ASIC or FPGA) and/or software during the preparation of the system of the present invention, and then become a part of the system of the present invention.

Specifically, when three or more solar blind ultraviolet imaging modules form an independent solar blind ultraviolet imaging system, the position data and/or angle data of the solar blind ultraviolet imaging modules are integrated by a normalized correlation algorithm. In this method, a vector $p_i(x_i,y_i,z_i)$ may be used to represent the $i^{th}$ group of positioning data among N groups of positioning data, which are subjected to angular and spatial transformation, returned by N solar blind ultraviolet imaging modules, where $i=1, 2, 3 \ldots N$, and x, y and z are three-axis coordinates of the N solar blind ultraviolet imaging modules; and, the positioning data, which is subjected to angular and spatial transformation, is obtained by the following method: when the relative positions of all the solar blind ultraviolet imaging modules and the attitude angle of the vessel are known, the measured position data of different measurement modules are converted into the measured position data of a same measurement module based on a spatial position relationship and through spatially geometric transformation. The specific transformation method is as follows: (1) a reference point is determined, wherein the reference point may be the position of any measurement module among the solar blind ultraviolet receiving modules, or may be another point; (2) the distance from each other measurement module to the reference point and a direction angle (which is a parameter for a light source reference system and needs to be determined by superposing the attitude angle of the vessel) are measured, so that a corresponding transformation vector is obtained; and, (3) the transformation vector is added to the relative position coordinate parameters obtained by each measurement module to obtain the transformed positioning data.

A Normalized Correlation Coefficient (NCC) is used to represent the confidence of the position data of the reference point on the vessel returned by each subsystem, which is expressed as follows:

$$NCC(p_i) = \sum_{\substack{j=1 \\ i \neq j}}^{N} \frac{p_i \cdot p_j}{|p_i||p_j|} = \sum_{\substack{j=1 \\ i \neq j}}^{N} \frac{x_i x_j + y_i y_j + z_i z_j}{\sqrt{x_i^2 + y_i^2 + z_i^2}\sqrt{x_j^2 y_j^2 z_j^2}} \quad (1)$$

where $j=1, 2, 3, \ldots, N$, and the position of the reference point on the vessel may be a position of a solar blind ultraviolet receiving module.

The original positioning data may be processed by various methods. One way is as follows: a threshold G is set for the average confidence value of the detection system consisting of all the solar blind ultraviolet imaging modules; a higher weight is set for data with a higher G value to indicate that the data is reliable; and, a higher weight is set for data with a lower G value to indicate that the data is non-reliable. In an extreme case, a threshold G is set for the average confidence value of all the systems, and positioning data with a lower NCC is filtered according to the threshold G to obtain a final system confidence weight w, which is expressed as follows:

$$w(p_i) = \begin{cases} NCC(p_i), & NCC(p_i) > G \\ 0, & NCC(p_i) \leq G \end{cases} \quad (2)$$

Then, the final fitted positioning data is obtained:

$$p_{result} = \frac{\sum_{i=1}^{N} w(p_i) \times p_i}{\sum_{i=1}^{N} w(p_i)} \quad (3)$$

The attitude angle of the vessel may also be calculated according to the original positioning data obtained by the solar blind ultraviolet imaging modules. Further, the attitude angle is integrated.

In accordance with the method of the present invention, three components $\alpha$, $\beta$ and $\gamma$ of a direction vector of any reliable attitude angle may be integrated by a normalized correlation algorithm. Specifically, a vector $q_i(\alpha_i,\beta_i,\gamma_i)$ is used to represent N groups of positioning data returned by the N solar blind ultraviolet imaging modules, where $=1, 2, 3 \ldots N$; and, the confidence of the positioning data returned by each system is represented as follows by a normalized correlation coefficient:

$$NCC(q_i) = \sum_{\substack{j=1 \\ i \neq j}}^{N} \frac{q_i \cdot q_j}{|q_i||q_j|} = \sum_{\substack{j=1 \\ i \neq j}}^{N} \frac{\alpha_i \alpha_j + \beta_i \beta_j + \gamma_i \gamma_j}{\sqrt{\alpha_i^2 + \beta_i^2 + \gamma_i^2}\sqrt{\alpha_j^2 + \beta_j^2 + \gamma_j^2}} \quad (4)$$

When the attitude angle is a plane angle, a single attitude angle is measured, and two components $\alpha$ and $\beta$ of its direction vector may be obtained by performing cosine and sine operations on the angle. When any one attitude angle is a spatial angle, two attitude angles need to be measured correspondingly, a straight line representing the attitude angles is determined, and this straight line is protected onto three reference planes in the space to correspondingly obtain components of the direction of this straight line on the three reference planes.

In a real scene, when the pitching and rolling of the vessel are fierce in the poor weather conditions, it is possible to simultaneously perform the normalized correlation algorithm on three attitude angles, and the rotation of a three-dimensional coordinate system needs to be represented by four variables. The four variables may be solved by a general spatial geometry method.

In the normalized correlation method, a weight may be set for the positioning data with different thresholds G, and further processing is then performed. In an extreme case, a threshold G is set for the average confidence value of all the systems, and positioning data with a lower NCC is filtered according to the threshold G to obtain a final system confidence weight w, which is expressed as follows:

$$w(q_i) = \begin{cases} NCC(q_i), & NCC(q_i) > G \\ 0, & NCC(q_i) \le G \end{cases} \quad (5)$$

Then, the final fitted positioning data is obtained:

$$q_{result} = \frac{\sum_{i=1}^{N} w(q_i) \times q_i}{\sum_{i=1}^{N} w(q_i)} \quad (6)$$

And, the fitted attitude angle data of the vessel is calculated according to the fitted coordinates of any two of the N solar blind ultraviolet imaging modules.

According to another aspect of the present invention, data fusion may also be performed on the original coordinate data and attitude angle data, respectively. Various data fusion algorithms may be used.

For example, a first data fusion algorithm is as follows: a vector $p_i(x_i,y_i,z_i)$ is used to represent N groups of data detected by N measurement subsystem modules for measuring a same quantity (e.g., a group of coordinate values or a group of attitude angle values), wherein each subsystem detects one group of data, and i=1, 2, 3 . . . N.

In this algorithm, the confidence of the data returned by each subsystem is judged by using a root-mean-square-error rmse actually calculated by the measured data of each subsystem, where the formula for calculating the root-mean-square-error of the measured data of each subsystem is as follows:

$$rmse = \sqrt{\sum_{i=1}^{n}(x_i - x_f)^2/(n+1)} \quad (7)$$

where rmse represents the root-mean-square-error, $x_i$ represents the measured data of each measurement subsystem on the X-axis coordinate at a moment i, $x_f$ represents the filtered value of the data $x_i$ at the moment i, and n represents the total number of the measured data, i.e., the number of the subsystems. The filtered value at the moment i is generally obtained by Kalman filtering.

Determination of a weight: weight assignment is performed by curve fitting.

According to a robust statistics theory, information in the data may be classified into three categories: valid information, available information and harmful information. For the three kinds of data, the assignment of different weights thereto may make the three kinds of data play different roles. Therefore, the weight assignment may be performed by a method based on a segment, that is, the valid information may be completely received during fusion, the available information is selected according to a certain curve change, and the harmful information or invalid information is completely rejected. The mathematical expression is as follows:

$$\omega = \begin{cases} 0, & |e| \ge b \\ f(|e|), & b \ge |e| \ge a \\ 1, & |e| \le a \end{cases} \quad (8)$$

where ω is the weight, the parameter b is the minimum limit for judging outliers, and the parameter a is a boundary value between a valid numerical value and an available numerical value. If the error is greater than b, the error is considered as an outlier and the corresponding weight is 0. If the error is less than a, the error is considered as a valid value and the corresponding weight is 1. The weight of an intermediate available value is given according to a curve y=f(x). Furthermore, f(x) must fulfill the condition that, within an interval (a,b), f(x) decreases rapidly with the increase of the error. The f(x) is expressed as follows:

$$f(x) = \frac{1}{\sqrt{2\pi}\,\sigma} \exp\left(-\frac{(x-\mu)^2}{2\sigma^2}\right) \quad (9)$$

where μ and σ are a mean and a variance for the normal distribution, respectively. Since a normal curve exhibits the characteristics of a decreasing function within a region of x>μ, then μ=0; and actually, a half-normal curve is applied. The value of σ has great influence on the weight assignment coefficient, and may be given according to the "3σ" rule and in combination with the practical situation.

The normal curve fitting weight assignment method may be performed by the following formula:

$$a_{ki} = \frac{f(rmse_{ki})}{\sum_{i=1}^{n} f(rmse_{ki})} \text{ and } \sum_{i=1}^{N} a_{ki} = 1 \quad (10)$$

where $rmse_{ki}$ represents the root-mean-square-error of the $i^{th}$ system at a moment k, and $\alpha_{ki}$ represents the weight of the $i^{th}$ system at the moment k. The final result of data fusion is as follows:

$$\hat{X}_{ki} = \sum_{i=1}^{N} a_{ki} X_{ki} \quad (11)$$

where $\hat{X}_{ki}$ is the fused value at the moment k, and $X_{ki}$ represents the measured data obtained by each subsystem at the moment k.

In a similar way, a Y-axis coordinate y and a Z-axis coordinate z are obtained.

Another data fusion algorithm is as follows.

When the data to be integrated is the positioning data, a vector $p_i(x_i,y_i,z_i)$ is used to represent N groups of measured positioning data, which are subjected to angular and spatial transformation, returned by N measurement subsystems, where i=1, 2, 3 . . . N. The positioning data, which is subjected to angular and spatial transformation, is obtained by the following method: when the relative positions of all the solar blind ultraviolet imaging modules and the attitude angle of the vessel are known, the measured position data of different measurement modules are converted into the measured position data of a same measurement module based on a spatial position relationship and through spatially geometric transformation.

In this algorithm, a standard deviation (std) of each coordinate sequence (e.g., having N pieces of x-coordinate data) in the N groups of positioning data returned by the N subsystems is calculated as the basis for judging outliers (i.e., positioning data with a low reliability returned by a certain subsystem) in each coordinate sequence in the N groups of data. The standard deviation of each coordinate sequence is expressed as follows:

$$\sigma_{index} = \sqrt{(X_{index} - \overline{X}_{index})^2 / N}, \; index \in (x,y,z) \quad (12)$$

where, if $index \in (x,y,z)$, $\sigma_{index}$ presents the standard deviation of each coordinate sequence in the N groups of data, $X_{index}$ represents the N groups of measured data, each of which contains a group of coordinate values $(x,y,z)$, and $\overline{X}_{index}$ represents the average value of the N groups of data, i.e., a one-dimensional vector formed by the average value of each coordinate sequence.

The outliers may be judged by the following formula:

$$\text{outliers} = |X_{index} - \overline{X}_{index}| < C * \sigma_{index} \quad (13)$$

where outliers represent the obtained outliers. The outliers are characterized in that: once a coordinate value in a group of coordinate data consisting of x,y,z is judged as an outlier in its sequence, this group of coordinate values is judged as an outliner in the N groups of coordinate data. The meanings of the $X_{index}$, $\overline{X}_{index}$ and 6 index are described above. C is a constant coefficient which may be determined according to experimental experiences and requirements. The constant can be determined by: judging a fluctuation range of test values through lots of tests, selecting a symmetric range by using a mean of the test values as a center with lots of unreasonable points going beyond this range, and using half of the length of this range as C.

Then, the outliers are removed from the N groups of original measured data to obtain a new positioning data sequence x' having a dimensionality of N', and equally-weighted average data fusion is performed on X' to obtain the final fused data, as follows:

$$\hat{X}' = \frac{1}{N'} \sum_{i=1}^{N} X' \quad (14)$$

where $\hat{X}'$ is the final positioning data after data fusion. The algorithm flow includes: 1) calculating a standard deviation for each coordinate sequence in the positioning data; (2) obtaining outliers in each coordinate sequence according to the calculated standard deviation; (3) removing the outliers from the original measured data; and, (4) calculating final positioning data by equally-weighted data fusion so as to eventually obtain the final X-axis coordinate value x of the reference point on the vessel. Similarly, a Y-axis coordinate value y and a Z-axis coordinate value z are obtained, respectively.

In a similar way, the attitude angle data may be fused to obtain the final attitude angle data of the vessel.

According to another aspect of the present invention, the present invention provides a device for enhancing a vessel's close-distance berthing capability. In the device for berthing a vessel, a position and attitude angle of the vessel relative to a shoreline are determined by a solar blind ultraviolet imaging method. The device includes:

1) at least two solar blind ultraviolet imaging modules which are arranged on the vessel, each solar blind ultraviolet imaging module including a solar blind ultraviolet receiver configured to receive light signals from a solar blind ultraviolet light source array arranged in advance on the shore and convert the light signals into corresponding electrical signals; and 2) a signal processor including a data processing portion and a portion electrically connected to an external device, the signal processor being electrically connected to the solar blind ultraviolet imaging modules and configured to: receive the electrical signals transmitted by the solar blind ultraviolet imaging modules, process the electrical signals to obtain a translation vector of each solar blind ultraviolet imaging module relative to the solar blind ultraviolet light source array, further obtain a distance from the vessel to a target lattice from the translation vector, and calculate, according to preset coordinate values of the solar blind ultraviolet light source array, the position of each solar blind ultraviolet imaging module on the vessel relative to a shoreline; and, calculate, according to the received electrical signals representing solar blind ultraviolet light signals, a vector representation of a connection line between the solar blind ultraviolet imaging modules in a target lattice coordinate system, obtain, according to an arrangement mode of all the solar blind ultraviolet imaging modules on the vessel, a vector representation of the vessel in the target lattice coordinate system, and calculate, according to a preset or measured vector representation of a shoreline of a wharf in the target lattice coordinate system, an attitude angle of an axis of the vessel relative to the shoreline.

When in less wavy weather, the pitching and shaking of the vessel are gentle, and among the attitude angles, only the included angle between the axis of the vessel and the shoreline is meaningful. In other words, in this case, the angle of pitch and the angle of roll are approximate to zero. To improve the accuracy of measurement, the solar blind ultraviolet imaging modules may be sparsely arranged on the vessel.

According to a further aspect of the device for berthing a vessel of the present invention, the software and hardware portions of the signal processor are designed to integrate the obtained coordinate and/or attitude angle data to obtain corresponding coordinate data and/or attitude angle data better representing the position of the vessel relative to the shoreline. When the device includes three or more solar blind ultraviolet imaging modules, the accuracy of measurement of the coordinates and the attitude angle of the vessel may be improved by this processing mode of the signal processor.

The signal processor may be designed to integrate the coordinate data and attitude angle data of the vessel by a normalized correlation algorithm, and the specific processing process is the same as the normalized correlation algorithm described in the method of the present invention.

Further, in the device for berthing a vessel of the present invention, the signal processor may also be designed to integrate two kinds of different data on the coordinates and the attitude angle of the vessel by a data fusion algorithm, and the specific processing process is the same as the two data fusion algorithms described in the method of the present invention.

With the auxiliary berthing method and system for a vessel provided by the present invention, the problem in the prior art that the vessel has berthing difficulty in the foggy weather and the problem in the prior art that piloting and berthing devices for a vessel are greatly affected by weather, environment and the like can be remarkably solved. Even in the foggy weather, more visual, accurate and safe navigation information can be provided for a pilot, so that it is convenient for the pilot to pilot the vessel for berthing in the foggy weather, and the smoothness of waterways and port logistics in the foggy weather is thus ensured.

BRIEF DESCRIPTION OF THE DRAWINGS

Some details of the present invention will be described below by the following accompanying drawings, in which.

DETAILED DESCRIPTION OF THE INVENTION

According to an example of the present invention, a system for improving a vessel's close-distance navigation capability may be provided. This system is able to display a schematic diagram of a vessel and a shoreline and the position information, so that a pilot is able to berth the vessel at low visibility through an output interface of a display device.

For this purpose, the present invention will be further described below with reference to the accompanying drawings by embodiments. The following embodiments are merely illustrative, and the present invention is not limited to the solutions in the embodiments. Additionally, all technical solutions obtained by simple transformation by those skilled in the art within the scope of the prior art shall fall into the protection scope of the present invention.

Embodiment 1

Figure 1:
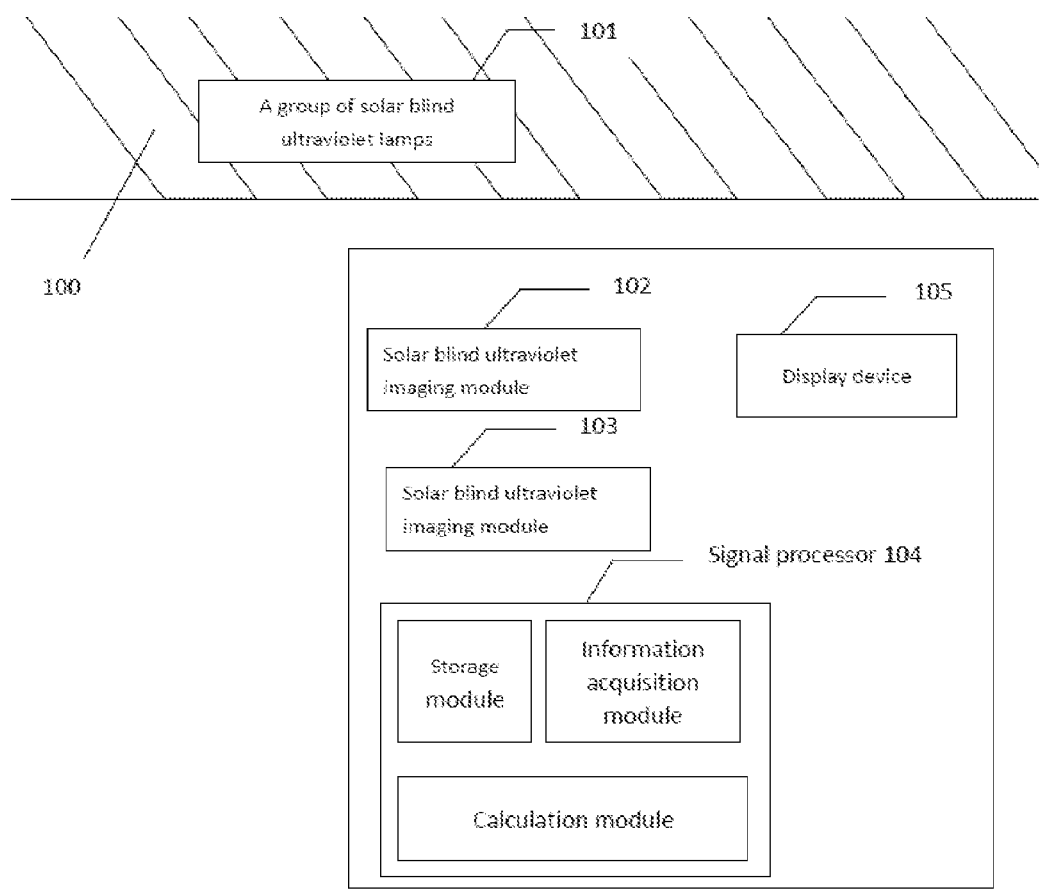
FIG. 1 is a block diagram of a system for berthing and navigating a vessel according to the present invention.

In this embodiment, as shown in FIG. 1, the system includes a group of solar blind ultraviolet lamps 101, two solar blind ultraviolet imaging modules 102 and 103, a signal processor 104 and a display device 105.

Figure 2:
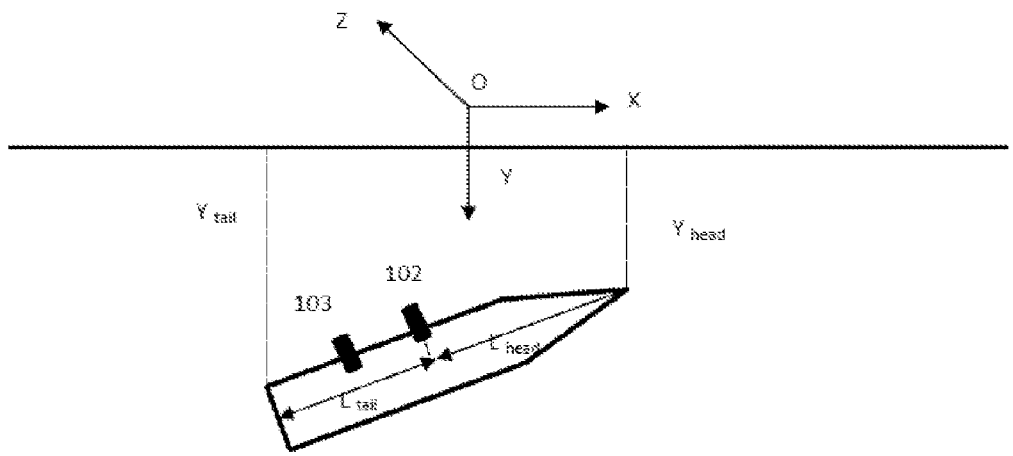
FIG. 2 is a diagram showing a mounting position of the equipment.

The two solar blind ultraviolet imaging modules 102 and 103 are mounted on a same side of the vessel's rail at a certain interval. One solar blind ultraviolet imaging module 102 is mounted on a deck at a position closer to the head portion of the vessel, and has a distance $L_{head}$ to the head portion of the vessel and a distance $L_{tail}$ to the tail portion of the vessel; while the other solar blind ultraviolet imaging module 103 is mounted on the deck at a position farther away from the head portion of the vessel. The specific mounting positions are roughly shown in FIG. 2.

The solar blind ultraviolet imaging modules 102, the signal processor 104 and the display device 105 may be integrated together. The signal processor includes an information acquisition module, a calculation module and a storage module. The information acquisition module acquires image information generated by the solar blind ultraviolet imaging modules 102 and 103 in real time, and transmits all the data to the calculation module. This embodiment includes the following main steps.

Figure 3:
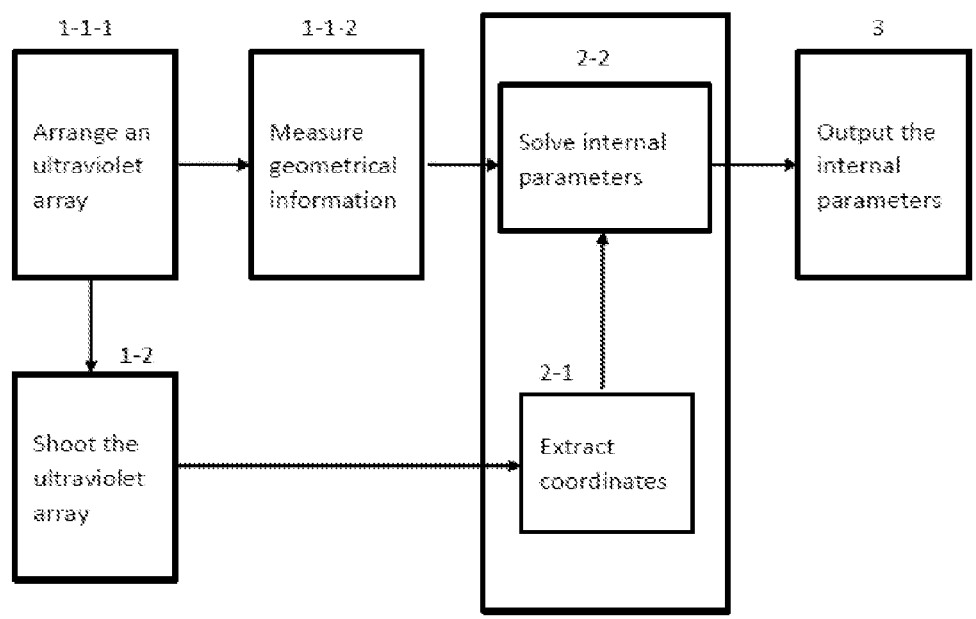
FIG. 3 is a flowchart of camera calibration.
Figure 4:
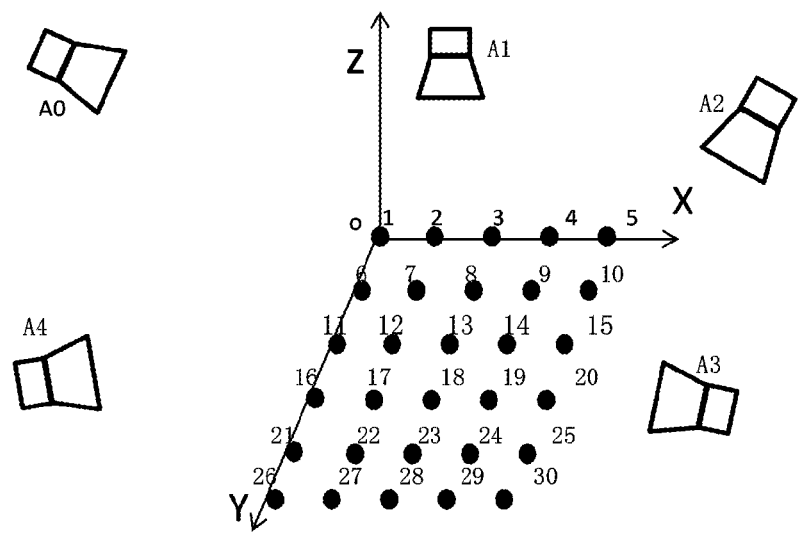
FIG. 4 is a diagram showing an ultraviolet light source array and a shooting position.

1. Ultraviolet cameras of the two solar blind ultraviolet modules are calibrated to obtain internal parameters. There are many methods for calibrating the camera and algorithms for obtaining the internal parameters. Here, a conventional calibration technology or Zhenyou Zhang's calibration algorithm is preferably selected. The calibration flow is shown in FIG. 3: step 1-1-1: an ultraviolet light source array is arranged; step 1-1-2: geometrical information of the ultraviolet light source array is measured; and, step 1-2: the ultraviolet light source array is shot by an ultraviolet receiver, where the ultraviolet light source array and the shooting position are shown in FIG. 4. The software processing includes a step 2-1 of acquiring image plane coordinates of a specified ultraviolet light source and a step 2-2 of solving the internal parameters of the camera by a calibration algorithm. Thus, the internal parameters ($f_x$, $f_y$, $c_x$, $c_y$, $k_x$, $k_y$, etc.) of the camera are obtained. The method for calibrating the camera will be exemplarily described hereinafter.

2: Berth information is measured: an included angle θ between each berth shoreline in a port for berthing and the north direction is measured in advance.

Figure 5:
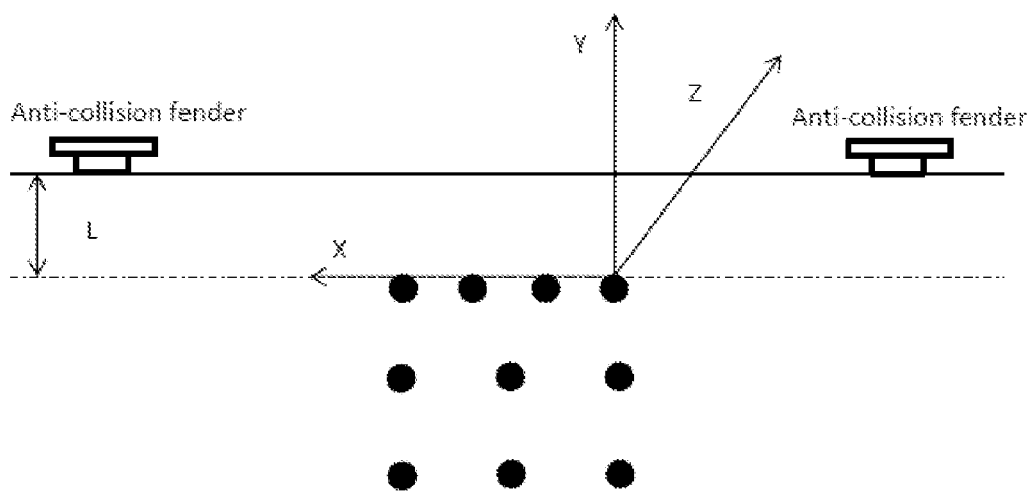
FIG. 5 is a diagram showing the position of a solar blind ultraviolet lamp array.

3. The ultraviolet light source lamp array is arranged and the related position information of the lamp array is measured: within half an hour before berthing the vessel, a target lamp array is arranged nearby the berth by using the group of solar blind ultraviolet lamps 101. The target lamp array is in a shape of a square grid. The size of the target lamp array and the number of lamps are not limited. In this embodiment, the arrangement of FIG. 5 is used, where the size of the lamp array is 8 m×8 m, with an equal spacing between the lamps in each row and an equal row pitch. In this embodiment, the distance from a reference point of the lamp array to a bollard of the berth is set as $L_{tail}$, where $L_{tail}$ is the distance from one solar blind ultraviolet imaging image 102 to the tail portion of the vessel and is known; the setting of $L_{tail}$ is to enable a solar blind ultraviolet detector to directly face the lamp array during the berthing of the vessel so as to determine the X direction of the vessel relative to the berth. Of course, other distance $L_n$ may also be used as long as the distance between $L_{tail}$ and $L_n$ is known. During the arrangement of the lamp array, the vertical distance from the first row of the lamp array to an anti-collision fender is L, as shown in FIG. 5.

4. The course of the vessel and the attitude and position information of the berth shoreline are calculated. Specifically:

Firstly, in accordance with the principle of the present invention, since the two solar blind ultraviolet imaging modules 102 and 103 may obtain their respective translation vectors relative to a target lattice, a vector representation of a connection line between the two solar blind ultraviolet imaging modules 102 and 103 in a target lattice coordinate system may be obtained: $(x_1,y_1,z_1)$, $(x_2,y_2,z_2)$. Since the two solar blind ultraviolet imaging modules 102 and 103 are mounted on one side of the vessel's rail, $(x_1,y_1,z_1)$ and $(x_2,y_2,z_2)$ are vector representations of the rail in the target lattice coordinate system during the berthing of the vessel. However, since a vector representation of a shoreline of a wharf in the target lattice coordinate system may be measured in advance and its vector direction is the same as the X-axis of the group of solar blind ultraviolet lamps 101, an included angle γ between the course of the vessel and the berth shoreline may be known:

if the vessel is berthed to the right, $$\gamma = \tan^{-1} \frac{y_2 - y_1}{x_2 - x_1}$$

(i.e., the degree of parallelism between the vessel and the shoreline of the port); and if the vessel is berthed to the left, $$\gamma = -\tan^{-1}\frac{y_2 - y_1}{x_2 - x_1}.$$

Since the angle of roll of the vessel is generally small, the angle of roll of the vessel is ignored in this embodiment.

In another embodiment, a level meter for measuring the angle of roll of the vessel may also be mounted on the vessel. The level meter may be placed on the bottom of a holder and in a same orientation as the horizontal orientation of the vessel.

Secondly, position information of the vessel relative to the shoreline is determined. At this moment, the solar blind ultraviolet imaging module 102 closer to the head portion of the vessel is used as reference.

When there is a close distance from the vessel to the shoreline, the solar blind ultraviolet imaging modules can clearly identify all signals. Then, the signal processor 104 performs image processing and coordinate transformation on the images taken by the solar blind ultraviolet imaging modules 102 and 103, to obtain position information X, Y and Z of the solar blind ultraviolet imaging modules 102 and 103 in the lamp array coordinate system.

$$\begin{bmatrix} X \\ Y \\ Z \end{bmatrix} = R^{-1} \cdot (-T)$$

where R is a rotation matrix, and T is a translation vector.

Figure 6:
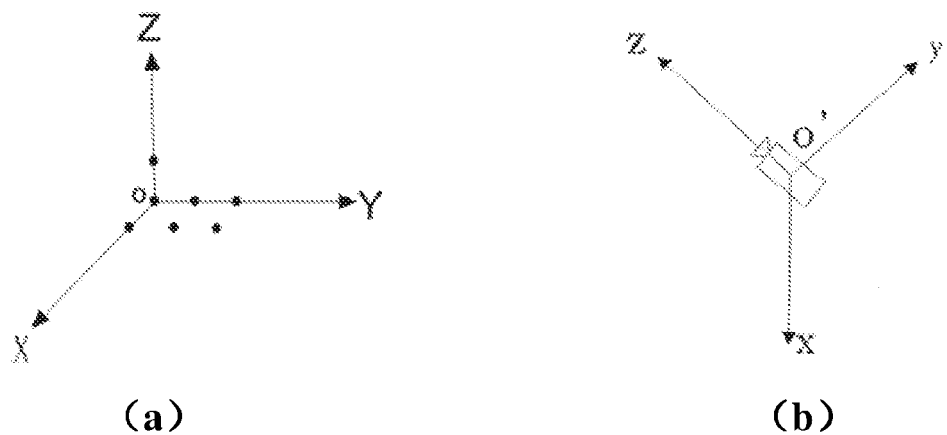
FIG. 6 shows a lattice coordinate system (a) and a camera coordinate system (b)

The algorithm includes the following specific steps:

since the internal parameters of the cameras, the lattice coordinates and image plane coordinates of the target lattice coordinate system (referring to FIG. 6) are known by the camera calibration, coordinates and rotation directions of the camera in the target lattice coordinate system may be obtained:

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \cdot \left( R \cdot \begin{bmatrix} X \\ Y \\ Z \end{bmatrix} + T \right) \quad (1)$$

where ($f_x, f_y, c_x, c_y$) represent internal matrix parameters, R is a rotation matrix, T is a translation vector, (u,v) is image plane coordinates (in pixels), and (X,Y,Z) represents lattice coordinates in the target lattice coordinate system; and, the formula may be simplified as follows:

$$\begin{bmatrix} x \\ y \\ z \end{bmatrix} = R \cdot \begin{bmatrix} x \\ y \\ z \end{bmatrix} + T \quad (2)$$

where (x,y,z) represents coordinates of a target lattice in the camera coordinate system (referring to FIG. 6), so that R and T may be interpreted as a transformation matrix for transforming the target lattice coordinate system into the camera coordinate system.

During the calculation of the coordinates of the camera in the target lattice coordinate system, since both the internal parameters ($f_x, f_y, c_x, c_y$) and the lattice coordinates (X,Y,Z) in the target lattice coordinate system are fixed values and the image plane coordinates (u,v) are acquired from an image in real time, the rotation matrix $R_0$ and the translation vector $T_0$ at the same moment ($u_0, v_0$) may be correspondingly obtained in real time. Then, if it is required to obtain the lattice coordinates of the camera in the target lattice coordinate system, the origin (0,0,0) of the camera coordinate system is substituted into the left side of the formula 2 to solve ($X_0, Y_0, Z_0$) on the right side, thus:

$$\begin{bmatrix} X_0 \\ Y_0 \\ Z_0 \end{bmatrix} = R_0^{-1} \cdot (-T_0) \quad (3)$$

An inverse matrix $R_0^{-1}$ of the rotation matrix represents the rotation of the camera coordinate system relative to the target lattice coordinate system, and may be simplified into a rotation vector through transformation. This vector represents an Euler angle of rotation of the camera relative to the target lattice coordinate system.

Among the fixed values mentioned during the calculation of the camera coordinates, the target lattice coordinate is a result measured after manual arrangement, and the internal parameters represent intrinsic parameters of the camera, where $f_x$ and $f_y$ are values of focal lengths by using the number of pixels in the horizontal direction and the vertical direction as a unit of measurement, and $c_x$ and $c_y$ are coordinates of pixels formed by the right front of the center of a camera lens (i.e., a point on a theoretically optical axis) on an image plane.

The distance from the connection line between the solar blind ultraviolet imaging modules 102 and 103 to the shoreline in a vertical direction, i.e., along the vessel's rail, is set as $Y_{rail}$. In this case, without considering the angle of roll of the vessel, $Y_{rail}$=Y−L, where L is the distance from the first row of the lamp array to the anti-collision fender. If the distance from the head portion of the vessel to the shoreline in the vertical direction is set as $Y_{head}$ and the distance from the tail portion of the vessel to the shoreline in the vertical direction is set as $Y_{tail}$, $Y_{head}$=$Y_{rail}$−$L_{head}$*sin a, and $Y_{tail}$=$Y_{rail}$+$L_{tail}$*sin a, where $L_{head}$ and $L_{tail}$ are the distances from the solar blind ultraviolet imaging module 102 to the head portion of the vessel and to the tail portion of the vessel, respectively, and a is an included angle between the course of the vessel and the berth shoreline.

After the data is obtained, the schematic diagram and position information of the vessel and the shoreline may be displayed on the display device 105, so that it is convenient for a pilot to pilot the vessel, as shown in FIG. 11.

Figure 7:
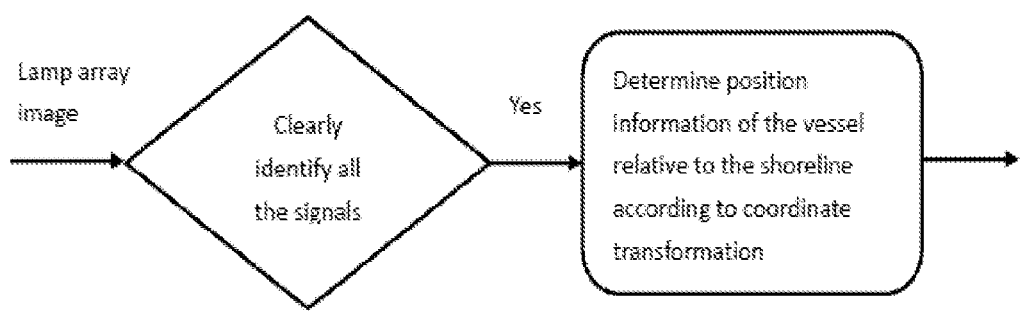
FIG. 7 is a flowchart of execution of berthing software.

9. Scene simulation is performed to output a schematic navigation diagram and the position coordinate information into the display device 105. FIG. 7 shows a flowchart of execution of the berthing software. Before the signal processor 105 operates, information about the berth, including the berth number and direction information of the vessel relative to the shoreline during berthing (i.e., berthing to the left or berthing to the right), is input; position information $L_{head}$ and $L_{tail}$ of the solar blind ultraviolet imaging modules on the vessel is input, where $L_{head}$ and $L_{tail}$ are the distances from the solar blind ultraviolet imaging modules to the head portion of the vessel and to the tail portion of the vessel, respectively; and, the width B of the vessel is input.

Figure 8:
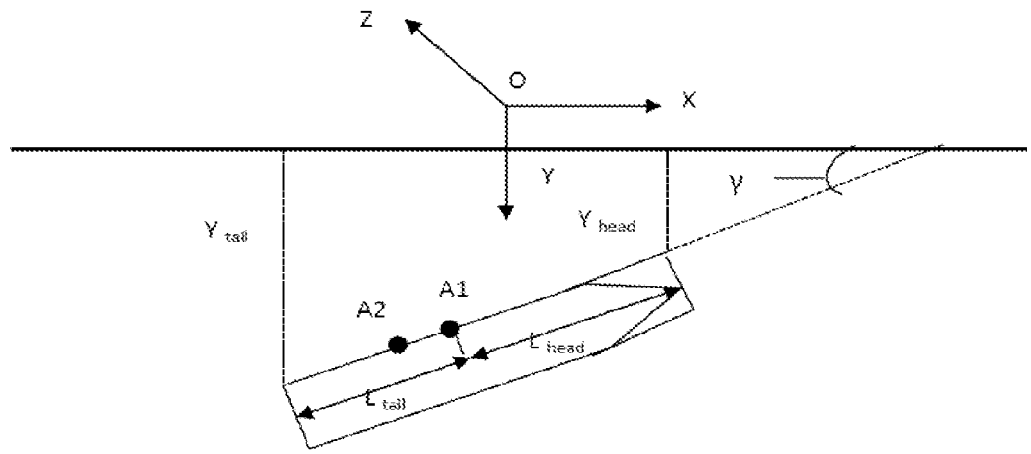
FIG. 8 is a schematic diagram of a vessel and a shoreline.

According to the position information X and Y of the vessel in the lamp array coordinate system, the direction information y of the vessel relative to the shoreline, the position information $L_{head}$ and $L_{tail}$ of the solar blind ultraviolet imaging modules relative to the vessel and the width B of the vessel, the schematic diagram and position information $Y_{head}$ and $Y_{tail}$ of the vessel and the shoreline may be displayed on the display device 105, as shown in FIG. 8. Thus, the pilot can realize the berthing of the vessel at low visibility through the output interface of the display device.

When in heavily wavy weather, the vessel swings and shakes fiercely, and the course angle, the angle of pitch and the angle of roll need to be taken into consideration during the calculation of the attitude angle of the vessel. However, when in less wavy weather, the vessel does not swing fiercely, and the vessel is approximately in the horizontal direction. In this case, the course angle of the vessel may represent the direction of the vessel relative to the shoreline, and the angle of pitch and the angle of roll need not to be taken into consideration or calculation.

In this embodiment, the solar blind ultraviolet imaging module 102 closer to the head portion of the vessel is used as reference. If two solar blind ultraviolet imaging modules are used as reference, it is assumed that the coordinates of the two solar blind ultraviolet imaging modules 102 and 103 relative to the berth in the lamp array coordinate system are assumed as $A_1(X_1,Y_1,Z_1)$ and $A_2(X_2,Y_2,Z_2)$, respectively, and the distances from the solar blind ultraviolet imaging module 103 to the head portion of the vessel and to the tail portion of the vessel are assumed as $L_{head}'$ and $L_{tail}'$, respectively, then the distances obtained from $A_1$ and $A_2$ are as follows:

$$Y_{head} = Y_1 - \frac{L_{head} \times (Y_2 - Y_1)}{\sqrt{(X_1-X_2)^2 + (Y_1-Y_2)^2}} \quad (4)$$

$$Y_{tail} = Y_1 + \frac{L_{head} \times (Y_2 - Y_1)}{\sqrt{(X_1-X_2)^2 + (Y_1-Y_2)^2}}$$

$$Y'_{head} = Y_2 - \frac{L'_{head} \times (Y_2 - Y_1)}{\sqrt{(X_1-X_2)^2 + (Y_1-Y_2)^2}}$$

$$Y'_{tail} = Y_2 + \frac{L'_{tail} \times (Y_2 - Y_1)}{\sqrt{(X_1-X_2)^2 + (Y_1-Y_2)^2}}$$

The differences between the both are as follows:

$$\Delta Y_{head} = \left[\sqrt{(X_1-X_2)^2 + (Y_1-Y_2)^2} - (L_{head} - L'_{head})\right] \times \quad (5)$$

$$\frac{(Y_2-Y_1)}{\sqrt{(X_1-X_2)^2 + (Y_1-Y_2)^2}}$$

$$\Delta Y_{tail} = \left[\sqrt{(X_1-X_2)^2 + (Y_1-Y_2)^2} - (L'_{tail} - L_{tail})\right] \times$$

$$\frac{(Y_2-Y_1)}{\sqrt{(X_1-X_2)^2 + (Y_1-Y_2)^2}}$$

where the distance between $A_1$ and $A_2$ is as follows:

$$L_{head} - L_{head}' = L_{tail}' - L_{tail} \quad (6)$$

Since $\sqrt{(X_1-X_2)^2+(Y_1-Y_2)^2}$ also represents the distance between $A_1$ and $A_2$, two errors $\Delta Y_{head}$ and $\Delta Y_{tail}$ are less than the error between the measured values $(L_{head}-L_{head}')^2$ and $\sqrt{(X_1-X_2)^2+(Y_1-Y_2)^2}$; and, if $L_{head}'$ is not measured, and instead $L_{head}'$ and $L_{tail}'$ are obtained from $\sqrt{(X_1-X_2)^2+(Y_1-Y_2)^2}$ and $L_{head}$, both the errors $\Delta Y_{head}$ and $\Delta Y_{tail}$ are zero.

Embodiment 2

When one solar blind ultraviolet imaging module is used, a group of three-dimensional position coordinate values of the vessel may be measured.

When two or more solar blind ultraviolet imaging modules are used, each of the solar blind ultraviolet imaging modules generates a group of coordinate data of the vessel. Thus, multiple groups of coordinate data of the vessel will be obtained.

The redundant original coordinate data of the vessel may be integrated by a normalized correlation algorithm.

The redundant original coordinate data of the vessel may also be integrated by a data fusion algorithm.

When two solar blind ultraviolet imaging modules are used, the attitude angle of the vessel may be measured.

When more than two solar blind ultraviolet imaging modules are used, the solar blind ultraviolet imaging modules are combined pairwise, and each combination may obtain or generate a group of attitude angle data of the vessel. Thus, multiple groups of attitude angle data of the vessel will be obtained.

The redundant original coordinate data of the vessel may be integrated by a normalized correlation algorithm.

In a further embodiment, multiple groups of coordinates (X,Y,Z) of a camera in a target lattice coordinate system are obtained by a plurality of solar blind ultraviolet imaging modules. To obtain the optimal positioning data, the algorithm is as follows.

A vector $p_i(x_i,y_i,z_i)$ is used to represent the positioning data, which is subjected to angular and spatial transformation, returned by N systems, where i=1, 2, 3 . . . N. The positioning data, which is subjected to angular and spatial transformation, is obtained by the following method: when the relative positions of all the solar blind ultraviolet imaging modules and the attitude angle of the vessel are known, the measured position data of different measurement modules are converted into the measured position data of a same measurement module based on a spatial position relationship and through spatially geometric transformation. The specific transformation method is as follows:

(1) a reference point is determined, wherein the reference point may be the position of any measurement module among the solar blind ultraviolet receiving modules, or may be another point;

(2) the distance from each other measurement module to the reference point and a direction angle (which is a parameter for a light source reference system and needs to be determined by superposing the attitude angle of the vessel) are measured, so that a corresponding transformation vector is obtained; and (3) the transformation vector is added to the relative position coordinate parameters obtained by each measurement module to obtain the transformed positioning data.

Figure 9:
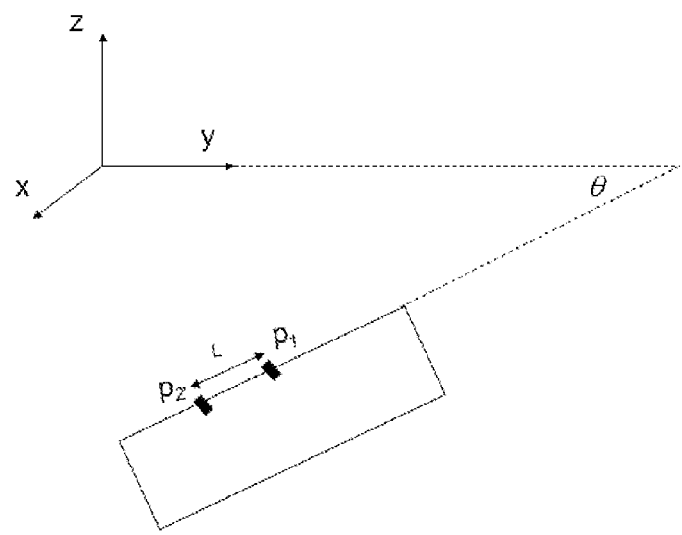
FIG. 9 is a schematic diagram of the positions of measurement modules.

As shown in FIG. 9, measurement coordinates of two measurement modules are $p_1(x_1,y_1,z_1)$ and $p_{2'}(x_{2'},y_{2'},z_{2'})$, respectively. If it is assumed that $p_i$ is used as a reference, the measured distance between the both is L, an included angle between the connection line of the both and the course is θ, and an angle of pitch is φ (an included angle with the XY plane), a method for calculating a transformation vector $\vec{A}=(a,b,c)$ is as follows:

$$\begin{cases} a = L \times \cos\varphi \times \cos\theta \\ b = L \times \cos\varphi \times \sin\theta \\ c = L \times \sin\theta \end{cases} \quad (7)$$

Then, the coordinate of $p_2$, after its transformation to the reference position is $p_2 = p_2 + \vec{A}$.

The transformed coordinates of other measurement modules may be obtained by the same method.

In the normalized correlation algorithm, a Normalized Correlation Coefficient (NCC) is used to represent the confidence of the positioning data returned by each system, which is expressed as follows:

$$NCC(p_i) = \sum_{\substack{j=1 \\ i \neq j}}^{N} \frac{p_i \cdot p_j}{|p_i||p_j|} = \sum_{\substack{j=1 \\ i \neq j}}^{N} \frac{x_i x_j + y_i y_j + z_i z_j}{\sqrt{x_i^2 + y_i^2 + z_i^2}\sqrt{x_j^2 + y_j^2 + z_j^2}} \quad (8)$$

If a threshold is set to be 80% of the average confidence value of all systems, the threshold G may be expressed as follows:

$$G = \frac{0.8}{N} \sum_{i=1}^{N} NCC(p_i) \quad (9)$$

The positioning data with a lower NCC is filtered according to the threshold G, to obtain a final system confidence weight w, which is expressed as follows:

$$w(p_i) = \begin{cases} NCC(p_i), & NCC(p_i) > G \\ 0, & NCC(p_i) \leq G \end{cases} \quad (10)$$

Thus, the final fitted positioning data is obtained:

$$P_{result} = \frac{\sum_{i=1}^{N} w(p_i) \times p_i}{\sum_{i=1}^{N} w(p_i)} \quad (11)$$

Figure 10:
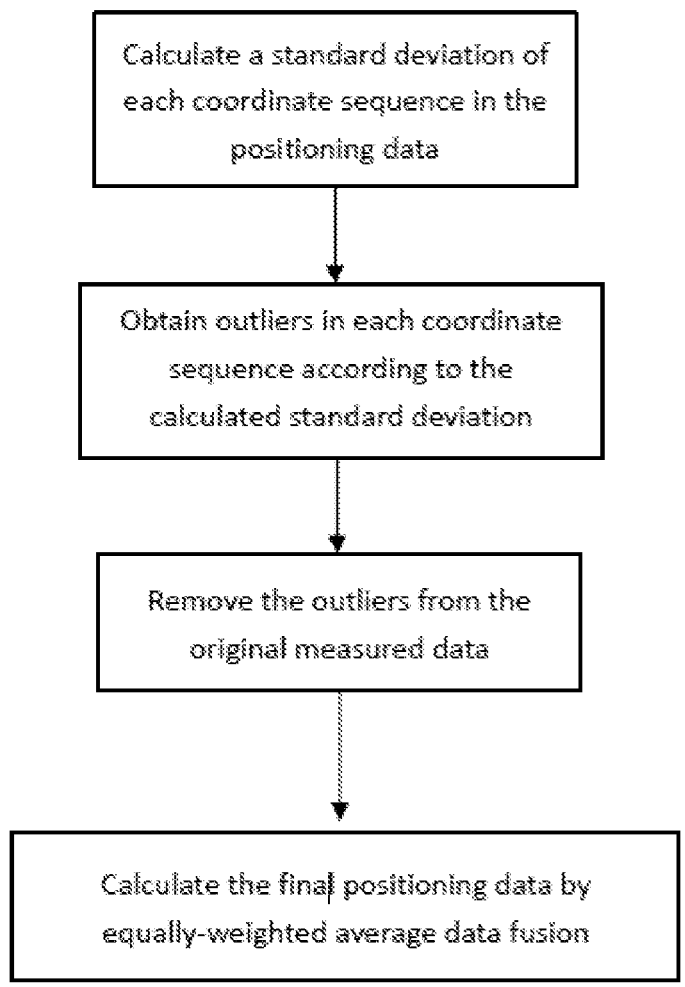
FIG. 10 is a process diagram of a data fusion algorithm.

The algorithm flow is shown in FIG. 10.

When the data to be integrated is azimuth angle data, a vector $q_i(\alpha_i, \beta_i, \gamma_i)$ is used to represent N groups of attitude angle data returned by N measurement subsystems, where =1, 2, 3 . . . N; and, the optimal attitude angle data is also calculated by the normalized correlation algorithm.

The original coordinate data and attitude angle data of the vessel may also be integrated by a data fusion algorithm.

Embodiment 3

The specific steps of performing ultraviolet camera calibration and solving internal parameters in a system with an enhanced close-distance vessel navigation capability according to the present invention will be described below.

There are many methods for calibrating a camera and algorithms for solving the internal parameters. Here, a conventional calibration technology or Zhenyou Zhang's calibration algorithm is preferably selected. In the Zhenyou Zhang's calibration algorithm, a checkerboard-shaped calibration template is used, and connection points of black and white checkers on the calibration template are used as feature points of the calibration target. Calibration targets are placed at different positions, and synchronous acquisition is performed on the camera to obtain internal and external parameters of the camera. This method does not require any expensive instruments, and is excellent in robustness, easy to operate and improved in accuracy in comparison with self-calibration. However, all calibration methods and algorithms for solving internal parameters available to this embodiment shall be included in the present invention.

FIG. 3 shows a calibration flow, where, in a step 1-1-1, an ultraviolet light source array is arranged; in a step 1-1-2, geometrical information of the ultraviolet light source array is measured; in a step 1-2, the ultraviolet light source array is shot by an ultraviolet receiver; and, the software processing includes a step 2-1 of acquiring image plane coordinates of a specified ultraviolet light source and a step 2-2 of solving the internal parameters of the camera by a calibration algorithm. The specific calibration steps are as follows.

Step 1-1-1: An ultraviolet light source array is arranged. The ultraviolet light source array is a planar and rectangular grid-shaped ultraviolet light source array. FIG. 4 shows the ultraviolet light source array and the shooting position. Geometrical features, such as shape and size, of the ultraviolet light source array are not limited, and are determined according to the algorithm for solving the internal parameters. The ultraviolet light source array may be a planar pattern or a stereoscopic pattern, and may be of a rectangular structure, a circular structure or in other geometrical shapes.

Step 1-1-2: Geometrical information of the ultraviolet light source array is measured, and coordinates $c_w = \{X_1, Y_1, Z_1\}, \{X_2, Y_2, Z_2\} \ldots \{X_{30}, Y_{30}, Z_{30}\}$ of a specific ultraviolet point in a coordinate system o-xyz are measured. The geometrical information of the ultraviolet light source array refers to the coordinates of the specific ultraviolet point or an angular point in the world coordinate system.

Step 1-2: The ultraviolet light source array is shot by a solar blind ultraviolet imaging module 104. The selected shooting position A should fulfill the following conditions: at different shooting positions, different orientations of the OA are not parallel, and n groups of images are shot, where n should be greater than 3 in this embodiment.

Step 2-2: The signal processor 105 performs software processing on the shot digital images to obtain image plane coordinate groups $ci_1, ci_2, ci_3 \ldots ci_n$ of the specific ultraviolet point, where there are total n groups.

Step 2-2: $c_w$ and $ci_1, ci_2 \ldots ci_n$ are processed by the Zhenyou Zhang's calibration algorithm to obtain internal parameters ($f_x$, $f_y$, $c_x$, $c_y$, $k_x$, $k_y$, etc.) of the camera.

The principle of the Zhenyou Zhang's calibration algorithm is as follows:

1) Correspondence Between Angular Points of the Calibration Target and Corresponding Image Points If the plane of the calibration target is assumed as $Z_w=0$, then:

$$s \begin{bmatrix} u \\ v \\ 1 \end{bmatrix} = A[r_1 \ r_2 \ r_3 \ T] \begin{bmatrix} X_w \\ Y_w \\ Z_w \\ 1 \end{bmatrix} = A[r_1 \ r_2 \ T] \begin{bmatrix} X_w \\ Y_w \\ 1 \end{bmatrix} = H \begin{bmatrix} X_w \\ Y_w \\ 1 \end{bmatrix} \quad (12)$$

where A is determined by $f_x$, $f_y$, $v_0$, $u_0$ and s, i.e., the internal parameters of the camera, and is related to only the internal structure of the camera; and, H is an external parameter of the camera, and directly reflects the position of the camera in the space. (u,v) represents the pixel coordinates in the image coordinate system, and the world coordinate system is $(X_w, Y_w, Z_w)$. S is an amplification factor, where $s=-f_x \cot \theta$. $f_x=f/\mu_x$ and $f_y=f/\mu_y$, where f is the focal length of the lens. $[X_w, Y_x, Z_w, 1]^T$ represents the world coordinates of any object point in the space, and $[u, v, 1]T$ represents the pixel coordinates of this object point in an imaging point of the camera.

The translation matrix $T=[T_x, T_y, T_z]^T$ is a 4×4 matrix, the rotation matrix R is an 3×3 orthogonal identity matrix, and both the translation matrix T and the rotation matrix R(r1 r2 r3) are external parameters.

If it is assumed that $H=[h_1\ h_2\ h_3]$ then:

$$H=[h_1 h_2 h_3]=\lambda A[r_1 r_2 T] \quad (13)$$

where $\lambda$ is an arbitrary scaling factor, $r_1$ is orthogonal to $r_2$, and two constraints for A can be obtained:

$$\begin{cases} h_1^T A^{-T} A^{-1} h_2 = 0 \\ h_1^T A^{-T} A^{-1} h_1 = h_2^T A^{-T} A^{-1} h_2 \end{cases} \quad (14)$$

2) Solution of Parameters $$B = A^{-T} A^{-1} = \begin{bmatrix} B_{11} & B_{12} & B_{13} \\ B_{21} & B_{22} & B_{23} \\ B_{31} & B_{32} & B_{33} \end{bmatrix} = \quad (15)$$

$$\begin{bmatrix} \frac{1}{f_x^2} & \frac{-s}{f_x^2 f_y} & \frac{v_0 s - u_0 f_y}{f_x^2 f_y} \\ \frac{-s}{f_x^2 f_y} & \frac{s^2}{f_x^2 f_y^2} + \frac{1}{f_y^2} & -\frac{s(v_0 s - u_0 f_y)}{f_x^2 f_y} - \frac{v_0}{f_y^2} \\ \frac{v_0 s - u_0 f_y}{f_x^2 f_y} & -\frac{s(v_0 s - u_0 f_y)}{f_x^2 f_y} - \frac{v_0}{f_y^2} & \frac{(v_0 s - u_0 f_y)^2}{f_x^2 f_y} + \frac{v_0^2}{f_y^2} + 1 \end{bmatrix}$$

It can be seen from the formula that B is a positive definite symmetric matrix, which is defined as follows:

$$b=[B_{11} B_{12} B_{22} B_{13} B_{23} B_{33}]^T \quad (16)$$

If it is assumed that the $i^{th}$ column of H is $h_i$, then:

$$h_i^T B h_j = v_{ij}^T b \quad (17)$$

and:

$$v_{ij}=[h_{1i}h_{1j}, h_{1i}h_{2j}+h_{2i}h_{1j}, h_{2i}h_{2j}, h_{3i}h_{1j}+h_{1i}h_{3j}, h_{3i}h_{2j}+h_{2i}h_{2j}+h_{2i}h_{3j}, h_{3i}h_{3j}]^T \quad (18)$$

hence:

$$\begin{bmatrix} v_{12}^T \\ (v_{11} - v_{22})^T \end{bmatrix} b = 0 \quad (19)$$

That is:

$$Vb=0 \quad (20)$$

where V is a 2n×6 matrix; and, when n>2, b has a unique solution, that is, at least three pictures needs to be collected. The internal parameters are decomposed by Cholesky decomposition:

$$\begin{cases} v_0 = -\frac{B_{12} B_{13} - B_{11} B_{23}}{B_{11} B_{22} - B_{12}^2} \\ \lambda = B_{33} - \left[ B_{13}^2 + \frac{v_0(B_{12} B_{13} - B_{11} B_{23})}{B_{11}} \right] \\ f_x = \sqrt{\frac{\lambda}{B_{11}}} \\ f_y = \sqrt{\frac{\lambda B_{11}}{B_{11} B_{22} - B_{12}^2}} \\ s = \frac{-B_{12} f_x^2 f_y}{\lambda} \\ u_0 = \frac{s v_0}{f_y} - \frac{B_{13} f_x^2}{\lambda} \end{cases} \quad (21)$$

Thus, the external parameters are solved:

$$\begin{cases} r_1 = \lambda A^{-1} h_1 \\ r_2 = \lambda A^{-1} h_2 \\ r_3 = r_1 \times r_2 \\ T = \lambda A^{-1} h_3 \end{cases} \quad (22)$$

3) Non-Linear Optimization

Parameter optimization is performed according to a maximum-likelihood criterion, and the target function is as follows:

$$\sum_{i=1}^{n} \sum_{j=1}^{m} \| m_{ij} - \overline{m}(A, R_i, T_i, M_j) \|^2 \quad (23)$$

where $\overline{m}$ is a projection of a point $M_j$, and may be solved by an LM optimization algorithm during the optimization.

The invention claimed is:
1. A method for berthing a vessel, comprising:
   providing at least two solar blind ultraviolet imaging modules on the vessel;
   receiving, by the at least two solar blind ultraviolet imaging modules, light signals transmitted by a solar blind ultraviolet light source comprising an array of solar blind ultraviolet lamps deployed on shore and defining a target lattice coordinate system;
   processing the received light signals by a signal processor to obtain a translation vector between each of the at least two solar blind ultraviolet imaging modules and a berth;
   calculating a vector representation of a line connecting the at least two solar blind ultraviolet imaging modules in the target lattice coordinate system;
   obtaining, according to an arrangement of the at least two solar blind ultraviolet imaging modules on the vessel, a vector representation of the vessel in the target lattice coordinate system;
   calculating, according to a preset or measured vector representation of the berth in the target lattice coordinate system, an attitude angle of an axis of the vessel relative to the berth; and
   determining a position and an attitude of the vessel relative to the berth,
   wherein a number of the at least two solar blind ultraviolet imaging modules is three or more, and position and/or angle information of the vessel relative to the berth measured by each solar blind ultraviolet imaging module is integrated to obtain a numerical value representing the position relationship between the vessel and the berth, and wherein the signal processor integrates position data of a reference point on the vessel relative to the berth or azimuth angle data of the vessel by a normalized correlation algorithm, then performs global error analysis to obtain a threshold for an average confidence value of a detection system consisting of the at least two the solar blind ultraviolet imaging modules and the confidence of each solar blind ultraviolet imaging module, filters positioning data with a lower confidence by using the threshold to obtain a final confidence weight for each solar blind ultraviolet imaging module, and performs weighted averaging on each solar blind ultraviolet imaging module by using the confidence weight.

2. The method for berthing a vessel according to claim 1, wherein a vector $p_i(x_i,y_i,z_i)$ is used to represent the $i^{th}$ group of position data among N groups of position data, which are subjected to angular and spatial transformation, returned by N solar blind ultraviolet imaging module detection subsystems, where i=1, 2, 3 . . . N and x, y and z are three-axis coordinates of the N solar blind ultraviolet imaging modules; and, the position data, which is subjected to angular and spatial transformation, is obtained by the following method: when the relative positions of all the solar blind ultraviolet imaging modules and the attitude angle of the vessel are known, the measured position data of different measurement modules are converted into the measured position data of a same measurement module based on a spatial position relationship and through spatially geometric transformation;

the normalized correlation algorithm used by the signal processor comprises the following specific steps:

using a Normalized Correlation Coefficient (NCC) to represent the confidence of the position data returned by the N detection subsystems:

$$NCC(p_i) = \sum_{\substack{j=1 \\ i \neq j}}^{N} \frac{p_i \cdot p_j}{|p_i||p_j|} = \sum_{\substack{j=1 \\ i \neq j}}^{N} \frac{x_i x_j + y_i y_j + z_i z_j}{\sqrt{x_i^2 + y_i^2 + z_i^2}\sqrt{x_j^2 + y_j^2 + z_j^2}} \quad (1)$$

j=1, 2, 3, . . . , N;

setting a threshold G for the average confidence value of the detection system consisting of all the solar blind ultraviolet imaging modules, and filtering the position data with a lower NCC according to the threshold G to obtain a final system confidence weight w, which is expressed as follows:

$$w(p_i) = \begin{cases} NCC(p_i), NCC(p_i) > G \\ 0, NCC(p_i) \leq G \end{cases} \quad (2)$$

and then, obtaining the final fitted position data on the position of the vessel:

$$p_{result} = \frac{\sum_{i=1}^{N} w(p_i) \times p_i}{\sum_{i=1}^{N} w(p_i)}. \quad (3)$$

3. The method for berthing a vessel according to claim 1, wherein three components $\alpha$, $\beta$ and $\gamma$ of a direction vector of any attitude angle are integrated by a normalized correlation algorithm, and a vector $q_i(\alpha_i,\beta_i,\gamma_i)$ is used to represent N groups of vector angle data returned by the N solar blind ultraviolet imaging module detection subsystems, where i=1, 2, 3 . . . N; and, the confidence of the position data returned by each solar blind ultraviolet imaging module system is represented as follows by a normalized correlation coefficient:

$$NCC(q_i) = \sum_{\substack{j=1 \\ i \neq j}}^{N} \frac{q_i \cdot q_j}{|q_i||q_j|} = \sum_{\substack{j=1 \\ i \neq j}}^{N} \frac{\alpha_i \alpha_j + \beta_i \beta_j + \gamma_i \gamma_j}{\sqrt{\alpha_i^2 + \beta_i^2 + \gamma_i^2}\sqrt{\alpha_j^2 + \beta_j^2 + \gamma_j^2}} \quad (4)$$

a threshold G is set for the average confidence value of the detection system consisting of all the solar blind ultraviolet imaging modules, and the position data with a lower NCC is filtered according to the threshold G to obtain a final system confidence weight w, which is expressed as follows:

$$w(q_i) = \begin{cases} NCC(q_i), NCC(q_i) > G \\ 0, NCC(q_i) \leq G \end{cases} \quad (5)$$

then, the final fitted position data is obtained:

$$q_{result} = \frac{\sum_{i=1}^{N} w(q_i) \times q_i}{\sum_{i=1}^{N} w(q_i)}; \quad (6)$$

and the fitted attitude angle data of the vessel is calculated according to the fitted coordinates of any two of the N solar blind ultraviolet imaging modules.

4. The method for berthing a vessel according to claim 1, wherein the signal processor integrates the position data or the attitude angle data by a data fusion method, respectively; and, the data fusion method comprises the following steps:

(I) when the data to be integrated is the position data, a vector $p_i(x_i,y_i,z_i)$ is used to represent N groups of position data, which are subjected to angular and spatial transformation, returned by N solar blind ultraviolet imaging module detection subsystems, where i=1, 2, 3 . . . N; the position data, which is subjected to angular and spatial transformation, is obtained by the following method: when the relative positions of all the solar blind ultraviolet imaging modules and the attitude angle of the vessel are known, the measured position data of different measurement modules are converted into the measured position data of a same measurement module based on a spatial position relationship and through spatially geometric transformation;

a) the confidence of the data returned by each subsystem is judged by using a root-mean-square-error rmse actually calculated by the measured data of each subsystem, where the formula for calculating the root-mean-square-error of the measured data of each subsystem is as follows:

$$rmse = \sqrt{\sum_{i=1}^{n}(x_i - x_f)^2/(n+1)} \quad (7)$$

where rmse represents the root-mean-square-error, $x_i$ represents the measured data of each measurement subsystem on the X-axis coordinate at a moment i, $x_f$ represents the filtered value of the data $x_i$ at the moment i, n represents the total number of the measured data, i.e., the number of the subsystems, and the filtered value at the moment i is obtained by Kalman filtering;

b) determination of a weight: weight assignment is performed by curve fitting on a segment basis:

$$\omega = \begin{cases} 0, |e| \geq b \\ f(|e|), b \geq |e| \geq a \\ 1, |e| \leq a \end{cases} \quad (8)$$

where ω is the weight, the parameter b is the minimum limit for judging outliers, and the parameter a is a boundary value between a valid numerical value and an available numerical value; if the error is greater than b, the error is considered as an outlier and the corresponding weight is 0; if the error is less than a, the error is considered as a valid value and the corresponding weight is 1; the weight of an intermediate available value is given according to a curve y=f(x), and f(x) must fulfill the condition that, within an interval (a, b), f(x) decreases rapidly with the increase of the error; and, the f(x) is expressed as follows:

$$f(x) = \frac{1}{\sqrt{2\pi}\sigma}\exp\left(-\frac{(x-\mu)^2}{2\sigma^2}\right) \quad (9)$$

where μ and σ are a mean and a square for the normal distribution, respectively; since a normal curve exhibits the characteristics of a decreasing function within a region of x>μ, then μ=0; actually, a half-normal curve is applied; and the f(x) is further expressed as follows:

$$f(x) = \frac{1}{\sqrt{2\pi}\sigma}\exp\left(-\frac{x^2}{2\sigma^2}\right) \quad (10)$$

the value of σ is given according to the 3σ rule, and can be obtained by a normal curve fitting weight assignment method through the following formula:

$$a_{ki} = \frac{f(rmse_{ki})}{\sum_{i=1}^{n} f(rmse_{ki})} \quad (11)$$

furthermore, $$\sum_{i=1}^{n} a_{ki} = 1,$$

where $rmse_{ki}$ represents the root-mean-square-error of the $i^{th}$ system at a moment $k_i$ and $a_{ki}$ represents the weight of the $i^{th}$ system at the moment k;

c) the final result of data fusion is as follows:

$$\hat{X}_{ki} = \sum_{i=1}^{n} a_{ki} X_{ki} \quad (12)$$

where $\hat{X}_{ki}$ is the fused value at the moment $k_i$ and $x_{ki}$ represents the measured data obtained by each subsystem at the moment k; and d) by the same method as in the steps a) to c), a final result of data fusion of the Y-axis coordinate value y and the Z-axis coordinate value z is calculated; and (II) when the data to be integrated is the attitude angle data, a vector $q_i(\alpha_i,\beta_i,\gamma_i)$ is used to represent N groups of attitude angle data returned by the N solar blind ultraviolet imaging module detection subsystems, where i=1, 2, 3 . . . N; and, by the same method as in the step (I), the integrated attitude angle data is calculated.

5. The method for berthing a vessel according to claim 1, characterized in that the signal processor integrates the position data or the attitude angle data by a data fusion method, respectively; and, the data fusion method comprises the following specific steps:

(I) when the data to be integrated is the position data, a vector $p_i(x_i,y_i,z_i)$ is used to represent N groups of position data, which are subjected to angular and spatial transformation, returned by N solar blind ultraviolet imaging module detection subsystems, where i=1, 2, 3 . . . N; the position data, which is subjected to angular and spatial transformation, is obtained by the following method: when the relative positions of all the solar blind ultraviolet imaging modules and the attitude angle of the vessel are known, the measured position data of different measurement modules are converted into the measured position data of a same measurement module based on a spatial position relationship and through spatially geometric transformation;

a) a standard deviation of each coordinate sequence in the position data is calculated: the standard deviation of each coordinate sequence in the N groups of position data returned by the N solar blind ultraviolet imaging module detection subsystems is calculated as the basis for judging outliers in each coordinate sequence in the N groups of data, where the standard deviation of each coordinate sequence is as follows:

$$\sigma_{index} = \sqrt{(X_{index} - \overline{X}_{index})^2/N} \quad (13)$$

where, if index∈(x,y,z), $\sigma_{index}$ presents the standard deviation of each coordinate sequence in the N groups of data, $X_{index}$ represents the N groups of measured data, each of which contains a coordinate value (x,y,z), and $\overline{X}_{index}$ represents the average value of the N groups of data, i.e., a one-dimensional vector formed by the average value of each coordinate sequence;

b) outliers in each coordinate sequence are obtained according to the calculated standard deviation, wherein the outliers can be judged by the following formula:

$$outliters = |X_{index} - \overline{X}_{index}| < C^*\sigma_{index} \quad (14)$$

where outliers represent the obtained outliers; once a coordinate value in a group of coordinate data consisting of x, y, z is judged as an outlier in its sequence, this group of coordinate values is judged as an outliner in the N groups of coordinate data; C is a constant coefficient determined according to experimental experiences and requirements; and the constant can be determined by: judging a fluctuation range of test values through lots of tests, selecting a symmetric range by using a mean of the test values as a center with lots of unreasonable points going beyond this range, and using half of the length of this range as C;

c) the outliers are removed from the N groups of original measured data to obtain a new position data sequence X' having a dimensionality of N', and performing equally-weighted average data fusion on X' to obtain final fused data, as follows:

$$\hat{X}' = \frac{1}{N'} \sum_{i=1}^{N} X' \quad (15)$$

where $\overline{X}'$ is the final position data after data fusion; and d) by the same method as in the steps a) to c), a final result of data fusion of the Y-axis coordinate value y and the Z-axis coordinate value z is calculated; and (II) when the data to be integrated is the attitude angle data, a vector $q_i(\alpha_i, \beta_i, \gamma_i)$ is used to represent N groups of attitude angle data returned by the N solar blind ultraviolet imaging module detection subsystems, where i=1, 2, 3 . . . N; and, by the same method as in the step (I), the integrated attitude angle data is calculated.

6. A system for berthing a vessel, comprising:
a solar blind ultraviolet light source comprising an array of solar blind ultraviolet lamps deployed on shore;
at least three solar blind ultraviolet imaging modules arranged on the vessel, each solar blind ultraviolet imaging module comprising a solar blind ultraviolet receiver configured to receive light signals from the solar blind ultraviolet light source and convert the light signals into corresponding electrical signals; and
a signal processor electrically connected to the at least two solar blind ultraviolet imaging modules and, in use, receives the electrical signals transmitted by the solar blind ultraviolet imaging modules, processes the electrical signals to obtain a translation vector of each solar blind ultraviolet imaging module relative to the solar blind ultraviolet light source, further obtains a distance from the vessel to a target lattice from the translation vector, and calculates the position of each solar blind ultraviolet imaging module on the vessel relative to a berth,
wherein the signal processor integrates the obtained coordinate and/or attitude angle data to obtain corresponding coordinate data and/or attitude angle data representing the position of the vessel relative to the berth,
wherein the signal processor is designed to use a normalized correlation algorithm; a vector $p_i(x_i, y_i, z_i)$ is used to represent the $i^{th}$ group of position data among N groups of position data, which are subjected to angular and spatial transformation, returned by N solar blind ultraviolet imaging module detection subsystems, where i=1, 2, 3 . . . N, and x, y and z are three-axis coordinates of the N solar blind ultraviolet imaging modules; and, the position data, which is subjected to angular and spatial transformation, is obtained by the following method: when the relative positions of all the solar blind ultraviolet imaging modules and the attitude angle of the vessel are known, the measured position data of different measurement modules are converted into the measured position data of a same measurement module based on a spatial position relationship and through spatially geometric transformation;

the normalized correlation algorithm used by the signal processor comprises the following specific steps:

using a Normalized Correlation Coefficient (NCC) to represent the confidence of the position data returned by the N detection subsystems:

$$NCC(p_i) = \sum_{\substack{j=1 \\ i \neq j}}^{N} \frac{p_i \cdot p_j}{|p_i||p_j|} = \sum_{\substack{j=1 \\ i \neq j}}^{N} \frac{x_i x_j + y_i y_j + z_i z_j}{\sqrt{x_i^2 + y_i^2 + z_i^2} \sqrt{x_j^2 + y_j^2 + z_j^2}} \quad (16)$$

j=1, 2, 3, . . . N;

setting a threshold G for the average confidence value of the detection system consisting of all the solar blind ultraviolet imaging modules, and filtering the position data with a lower NCC according to the threshold G to obtain a final system confidence weight w, which is expressed as follows:

$$w(p_i) = \begin{cases} NCC(p_i), & NCC(p_i) > G \\ 0, & NCC(p_i) \leq G \end{cases} ; \quad (17)$$

then, obtaining the final fitted position data on the position of the vessel:

$$p_{result} = \frac{\sum_{i=1}^{N} w(p_i) \times p_i}{\sum_{i=1}^{N} w(p_i)}. \quad (18)$$

7. The system for berthing a vessel according to claim 6, characterized in that the signal processor is designed to use a normalized correlation algorithm; three components α, β and γ of a direction vector of any attitude angle are integrated by the normalized correlation algorithm; a vector $q_i(\alpha_i, \beta_i, \gamma_i)$ is used to represent N groups of vector angle data returned by the N solar blind ultraviolet imaging module detection subsystems, where i=1, 2, 3 . . . N; and, the confidence of the position data returned by each solar blind ultraviolet imaging module system is represented as follows by a normalized correlation coefficient:

$$NCC(q_i) = \sum_{\substack{j=1 \\ i \neq j}}^{N} \frac{q_i \cdot q_j}{|q_i||q_j|} = \sum_{\substack{j=1 \\ i \neq j}}^{N} \frac{\alpha_i \alpha_j + \beta_i \beta_j + \gamma_i \gamma_j}{\sqrt{\alpha_i^2 + \beta_i^2 + \gamma_i^2} \sqrt{\alpha_j^2 + \beta_j^2 + \gamma_j^2}} \quad (19)$$

a threshold G is set for the average confidence value of the detection system consisting of all the solar blind ultraviolet imaging modules, and the position data with a lower NCC is filtered according to the threshold G to obtain a final system confidence weight w, which is expressed as follows:

$$w(q_i) = \begin{cases} NCC(q_i), & NCC(q_i) > G \\ 0, & NCC(q_i) \le G \end{cases} \quad (20)$$

then, the final fitted position data is obtained:

$$q_{result} = \frac{\sum_{i=1}^{N} w(q_i) \times q_i}{\sum_{i=1}^{N} w(q_i)}; \quad (21)$$

and the fitted attitude angle data of the vessel is calculated according to the fitted coordinates of any two of the N solar blind ultraviolet imaging modules.

8. The system for berthing a vessel according to claim 6, wherein the signal processor is designed to integrate the coordinate and/or attitude angle data of the vessel by a data fusion algorithm, and the data fusion algorithm comprises the following specific steps:

(I) when the data to be integrated is the position data, a vector $p_i(x_i, y_i, z_i)$ is used to represent N groups of position data, which are subjected to angular and spatial transformation, returned by N solar blind ultraviolet imaging module detection subsystems, where i=1, 2, 3 ... N; the position data, which is subjected to angular and spatial transformation, is obtained by the following method: when the relative positions of all the solar blind ultraviolet imaging modules and the attitude angle of the vessel are known, the measured position data of different measurement modules are converted into the measured position data of a same measurement module based on a spatial position relationship and through spatially geometric transformation;

a) the confidence of the data returned by each subsystem is judged by using a root-mean-square-error rmse actually calculated by the measured data of each subsystem, where the formula for calculating the root-mean-square-error of the measured data of each subsystem is as follows:

$$rmse = \sqrt{\sum_{i=1}^{n}(x_i - x_f)^2 / (n+1)} \quad (22)$$

where rmse represents the root-mean-square-error, $x_i$ represents the measured data of each measurement subsystem on the X-axis coordinate at a moment i, $x_f$ represents the filtered value of the data $x_i$ at the moment i, n represents the total number of the measured data, i.e., the number of the subsystems, and the filtered value at the moment i is obtained by Kalman filtering;

b) determination of a weight: weight assignment is performed by curve fitting on a segment basis:

$$\omega = \begin{cases} 0, & |e| \ge b \\ f(|e|), & b \ge |e| \ge a \\ 1, & |e| \le a \end{cases} \quad (23)$$

where ω is the weight, the parameter b is the minimum limit for judging outliers, and the parameter a is a boundary value between a valid numerical value and an available numerical value; if the error is greater than b, the error is considered as an outlier and the corresponding weight is 0; if the error is less than a, the error is considered as a valid value and the corresponding weight is 1; the weight of an intermediate available value is given according to a curve y=f(x), and f(x) must fulfill the condition that, within an interval (a,b), f(x) decreases rapidly with the increase of the error; and, the f(x) is expressed as follows:

$$f(x) = \frac{1}{\sqrt{2\pi}\sigma} \exp\left(-\frac{(x-\mu)^2}{2\sigma^2}\right) \quad (24)$$

where μ and σ are a mean and a square for the normal distribution, respectively; since a normal curve exhibits the characteristics of a decreasing function within a region of x>μ, then μ=0; actually, a half-normal curve is applied; and the f(x) is further expressed as follows:

$$f(x) = \frac{1}{\sqrt{2\pi}\sigma} \exp\left(-\frac{x^2}{2\sigma^2}\right) \quad (25)$$

the value of σ is given according to the 3σ rule, and can be obtained by a normal curve fitting weight assignment method through the following formula:

$$a_{ki} = \frac{f(rmse_{ki})}{\sum_{i=1}^{N} f(rmse_{ki})} \quad (26)$$

furthermore, $$\sum_{i=1}^{N} a_{ki} = 1,$$

where $rmse_{ki}$ represents the root-mean-square-error of the $i^{th}$ system at a moment $k$, and $a_{ki}$ represents the weight of the $i^{th}$ system at the moment k;

c) the final result of data fusion is as follows:

$$\hat{X}_{ki} = \sum_{i=1}^{N} a_{ki} x_{ki} \quad (27)$$

where $\hat{X}_{ki}$ is the fused value at the moment $k_i$ and $x_{ki}$ represents the measured data obtained by each subsystem at the moment k; and d) by the same method as in the steps a) to c), a final result of data fusion of the Y-axis coordinate value y and the Z-axis coordinate value z is calculated; and (II) when the data to be integrated is the attitude angle data, a vector $q_i(\alpha_i, \beta_i, \gamma_i)$ is used to represent N groups of attitude angle data returned by the N solar blind ultraviolet imaging module detection subsystems, where i=1, 2, 3 ... N; and, by the same method as in the step (I), the integrated attitude angle data is calculated.

9. The system for berthing a vessel according to claim 6, wherein the signal processor is designed to integrate the coordinate and/or attitude angle data of the vessel by a data fusion algorithm, and the data fusion algorithm comprises the following specific steps:

(I) when the data to be integrated is the position data, a vector $p_i(x_i,y_i,z_i)$ is used to represent N groups of position data, which are subjected to angular and spatial transformation, returned by N solar blind ultraviolet imaging module detection subsystems, where i=1, 2, 3 . . . N; the position data, which is subjected to angular and spatial transformation, is obtained by the following method: when the relative positions of all the solar blind ultraviolet imaging modules and the attitude angle of the vessel are known, the measured position data of different measurement modules are converted into the measured position data of a same measurement module based on a spatial position relationship and through spatially geometric transformation;

a) a standard deviation of each coordinate sequence in the position data is calculated: the standard deviation of each coordinate sequence in the N groups of position data returned by the N solar blind ultraviolet imaging module detection subsystems is calculated as the basis for judging outliers in each coordinate sequence in the N groups of data, where the standard deviation of each coordinate sequence is as follows:

$$\sigma_{index} = \sqrt{(X_{index} - \overline{X}_{index})^2 / N} \quad (28)$$

where, if index∈(x,y,z), $\sigma_{index}$ presents the standard deviation of each coordinate sequence in the N groups of data, $X_{index}$ represents the N groups of measured data, each of which contains a coordinate value (x,y,z), and $\overline{X}_{index}$ represents the average value of the N groups of data, i.e., a one-dimensional vector formed by the average value of each coordinate sequence;

b) outliers in each coordinate sequence are obtained according to the calculated standard deviation, wherein the outliers can be judged by the following formula:

$$\text{outliters} = |X_{index} - \overline{X}_{index}| < C^* \sigma_{index} \quad (29)$$

where outliers represent the obtained outliers; once a coordinate value in a group of coordinate data consisting of x,y,z is judged as an outlier in its sequence, this group of coordinate values is judged as an outliner in the N groups of coordinate data; C is a constant coefficient determined according to experimental experiences and requirements; and the constant can be determined by: judging a fluctuation range of test values through lots of tests, selecting a symmetric range by using a mean of the test values as a center with lots of unreasonable points going beyond this range, and using half of the length of this range as C;

c) the outliers are removed from the N groups of original measured data to obtain a new position data sequence X' having a dimensionality of N', and performing equally-weighted average data fusion on X' to obtain final fused data, as follows:

$$\hat{X}' = \frac{1}{N'} \sum_{i=1}^{N} X' \quad (30)$$

where $\hat{X}'$ is the final position data after data fusion; and d) by the same method as in the steps a) to c), a final result of data fusion of the Y-axis coordinate value y and the Z-axis coordinate value z is calculated; and (II) when the data to be integrated is the attitude angle data, a vector $q_i(\alpha_i,\beta_i,\gamma_i)$ is used to represent N groups of attitude angle data returned by the N solar blind ultraviolet imaging module detection subsystems, where i=1, 2, 3 . . . N; and, by the same method as in the step (I), the integrated attitude angle data is calculated.

10. The system for berthing a vessel according to claim 6, wherein a power control system of the vessel receives a berthing distance signal transmitted by the data processor, and automatically adjusts the attitude of the vessel for berthing based on the berthing distance signal.

* * * * *